United States Patent
Allen et al.

(10) Patent No.: US 12,058,113 B2
(45) Date of Patent: Aug. 6, 2024

(54) HYBRID KEY EXCHANGES FOR DOUBLE-HULLED ENCRYPTION

(71) Applicant: Amazon Technologies, Inc., Seattle, WA (US)

(72) Inventors: Nicholas Alexander Allen, Kirkland, WA (US); Matthew J. Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 438 days.

(21) Appl. No.: 16/903,873

(22) Filed: Jun. 17, 2020

(65) Prior Publication Data

US 2020/0403978 A1 Dec. 24, 2020

Related U.S. Application Data

(60) Provisional application No. 62/863,751, filed on Jun. 19, 2019.

(51) Int. Cl.
*H04L 29/06* (2006.01)
*H04L 9/08* (2006.01)
(Continued)

(52) U.S. Cl.
CPC .............. *H04L 63/045* (2013.01); *H04L 9/14* (2013.01); *H04L 63/205* (2013.01)

(58) Field of Classification Search
CPC ....... H04L 63/045; H04L 9/14; H04L 63/205; H04L 9/0838; H04L 2463/061; H04L 63/061; H04L 9/0816; H04L 63/0478
See application file for complete search history.

(56) References Cited

U.S. PATENT DOCUMENTS 9,781,081 B1 * 10/2017 Wasiq .................. H04L 63/166
2019/0245681 A1 * 8/2019 Alwen .................... H04L 9/085

FOREIGN PATENT DOCUMENTS

| CN | 104170312 A | 11/2014 |
| CN | 108476133 A | 8/2018 |

(Continued)

OTHER PUBLICATIONS

Benjamin Dowling, Marc Fischlin, Felix Günther, Douglas Stebila; "A Cryptographic Analysis of the TLS 1.3 Handshake Protocol Candidates"; CCS '15: Proceedings of the 22nd ACM SIGSAC Conference on Computer and Communications Security; Oct. 2015; pp. 1197-1210 (Year: 2015).*

(Continued)

*Primary Examiner* — Fatoumata Traore
*Assistant Examiner* — Courtney D Fields
(74) *Attorney, Agent, or Firm* — Davis Wright Tremaine LLP

(57) ABSTRACT

A first computing system establishes a cryptographically protected communication session with a second computing system by proposing a hybrid cryptographic scheme. In response to the proposed hybrid cryptographic scheme, a second computing system transmits cryptographic materials to the first computing system, and the first computing system transmits cryptographic materials to the second computing system. Using the cryptographic materials, two or more cryptographic keys are derived. One cryptographic key is used to perform an inner cryptographic operation on one or more data items, and another cryptographic key is used to perform an outer cryptographic operation on the one or more data items that have been cryptographically protected by the inner cryptographic operation.

19 Claims, 10 Drawing Sheets

(51) Int. Cl.
  *H04L 9/14* (2006.01)
  *H04L 9/40* (2022.01)
  *H04L 9/32* (2006.01)

(56) References Cited

FOREIGN PATENT DOCUMENTS

| CN | 108885665 A | 11/2018 | | |
|---|---|---|---|---|
| CN | 109347835 A | 2/2019 | | |
| WO | WO-2017100217 A1 | * | 6/2017 | ......... H04L 63/0442 |

OTHER PUBLICATIONS

Campagna, et al., "BIKE and SIKE Hybrid Key Exchange Cipher Suites for Transport Layer Security (TLS)," Internet Engineering Task Force, Mar. 27, 2019, 19 pages.

Tjhai, et al., "Hybrid Quantum-Safe Key Exchange for Internet Key Exchange Protocol Version 2 (IKEv2)," Internet Engineering Task Force, Jul. 18, 2017, 24 pages.

International Search Report and Written Opinion, mailed Sep. 29, 2020, for International Patent Application No. PCT/US2020/038531, filed Jun. 18, 2020.

Kapusta et al., Enhancing data protection in a distributed storage environment using structure-wise fragmentation and dispersal of encrypted data, IEEE 12th International Conference on Big Data Science and Engineering, Aug. 1, 2018, 6 pages.

Barker et al., "Recommendation for Pair-Wise Key-Establishment Schemes Using Discrete Logarithm Cryptography," NIST Special Publication 800-56A Revision 3, Apr. 2018, 152 pages.

China Intellectual Property Office First Office Action and Examination Report, Application No. 202080044425.6, dated Mar. 9, 2023, 10 pages.

European Patent Office Communication pursuant to Article 94(3) EPC dated Sep. 22, 2023, Application No. 20743393.9, 7 pages.

China Intellectual Property Office Second Office Action and Examination Report, Application No. 202080044425.6, dated Sep. 7, 2023, 8 pages.

* cited by examiner

HYBRID KEY EXCHANGES FOR DOUBLE-HULLED ENCRYPTION

CROSS-REFERENCE TO RELATED APPLICATIONS

This application claims the benefit of U.S. Provisional Application No. 62/863,751, filed Jun. 19, 2019, entitled "HYBRID KEY EXCHANGES FOR DOUBLE-HULLED ENCRYPTION," the entire contents of which is incorporated herein by reference.

BACKGROUND

Security is an important component of network communications as network communications often contain sensitive data. Users rely on network service providers to deploy critical technologies to ensure that their transactional information remains secure against a growing threat of global online attackers. Network communications are generally secured through cryptographically protected communication protocols that facilitate the security of communication sessions between clients and servers. Despite major efforts to keep data from falling to the hands of unauthorized entities, techniques used by malicious entities remain successful and are constantly evolving. Not only does keeping up with this evolution require significant resources by itself, but updating technology to keep data secure involves additional significant resources to ensure compatibility going forward.

BRIEF DESCRIPTION OF THE DRAWINGS

Various techniques will be described with reference to the drawings, in which.

DETAILED DESCRIPTION

Figure 1:
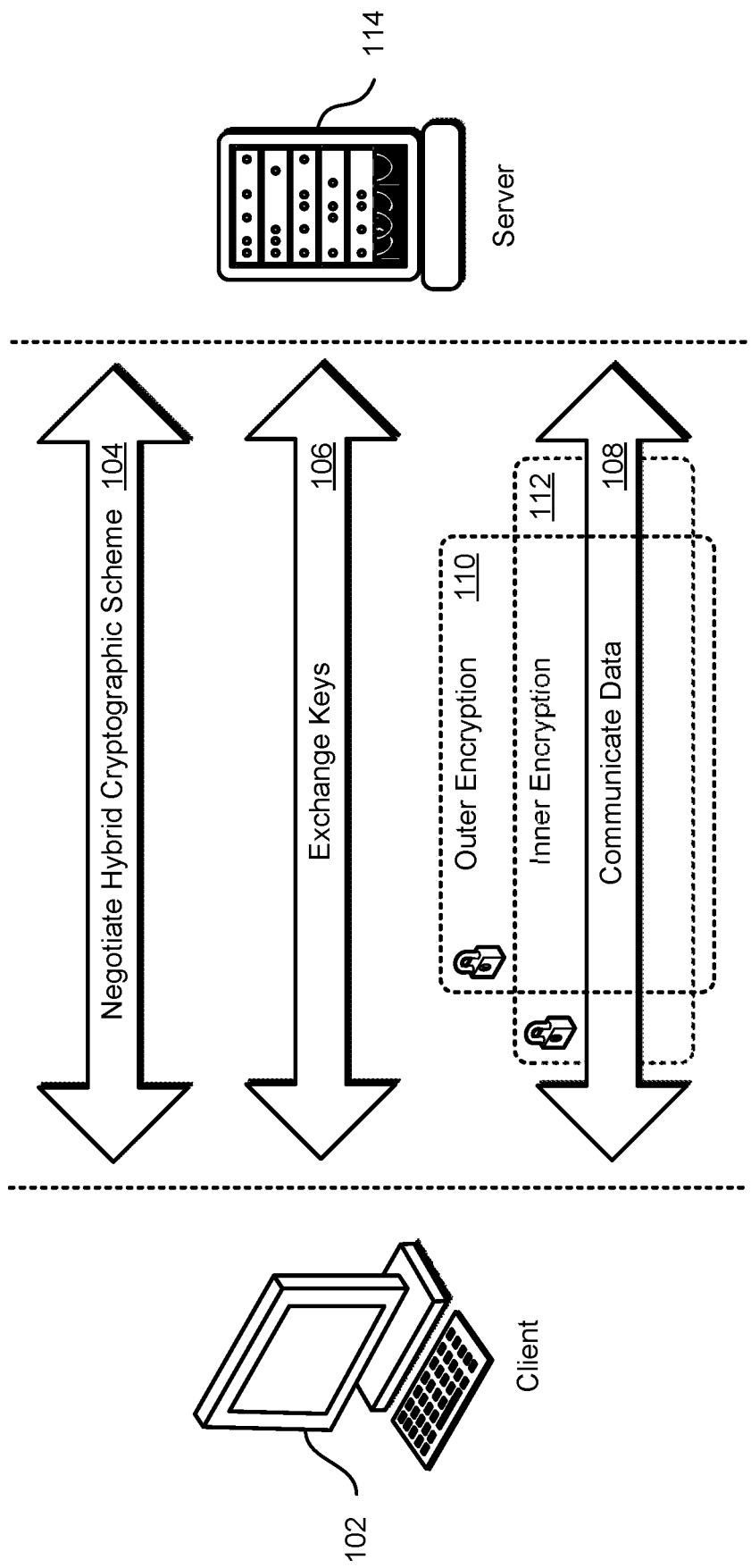
FIG. 1 illustrates an embodiment wherein a client communicates with a server using a communication channel secured by double-hull encryption.

The present document describes various systems and methods to facilitate a new type of hybrid cryptographic key exchange that is able to combine the security of post-quantum cryptographic techniques with the robustness of classical cryptographic key exchange techniques, while ensuring a path for industry adoption, standards-compliance, and certification. This is accomplished, in some examples, through the use of double-hull encryption. In double-hull encryption, at least two separate encryption operations are performed using distinct encryption keys provided by a hybrid cryptographic key exchange. As a result of using double-hull encryption, the overall security provided by the described scheme is equivalent to (at least as strong) the greatest amount of security provided by any one of the separate individual encryption operations. Standards-compliant aspects of the later-applied classical cryptographic operation are retained along with the security improvements of the earlier applied quantum-safe cryptographic operation. This improved technique provides a handshake that results in the negotiation of multiple cryptographic keys for a session to enable at least double-hull encryption while adhering to common protocols for establishment of cryptographically protected sessions.

In an example embodiment, double-hull encryption begins when a first device (such as a client device, as described below in conjunction with FIG. 10) prompts a second device (such as a network server device, as described below in conjunction with FIG. 10) to begin communication using a hybrid cryptographic scheme. A hybrid cryptographic scheme is a method of securing data, such as data transferred between a first device and a second device, using two or more different cryptographic protocols or algorithms, wherein the data transferred is encrypted in a first round with a first cryptographic algorithm, such as a quantum-safe algorithm described below in conjunction with FIG. 2. The data encrypted in a first round with a first cryptographic algorithm is then encrypted in a second round with a second cryptographic algorithm, such as a modern public-key cryptographic algorithm or shared-key cryptographic algorithm, as described below in conjunction with FIG. 2.

In order to use double-hull encryption, in an example embodiment, a first device negotiates with a second device on which hybrid cryptographic scheme to use, including which cryptographic algorithms are to be utilized in performing double-hull encryption. Once a mutual hybrid cryptographic scheme is established between a first device and a second device, a key exchange is performed. A key exchange, as described in further detail below in conjunction with FIGS. 2-5, allows a first device and a second device to obtain keys necessary to perform encryption using a hybrid cryptographic scheme.

After keys are exchanged between the first device and second device, data is either directly encrypted or encrypted as it is passed through a secure communication channel, as described below in conjunction with FIGS. 6-8. First, data is encrypted using a first cryptographic algorithm and a first key for an inner layer of encryption. This inner layer of encryption may be quantum-safe encryption, as described below. Second, data previously encrypted with a first cryptographic algorithm using a first key is encrypted with a second cryptographic algorithm using a second key. This outer layer of encryption is a commonly used encryption standard or protocol, as described below in conjunction with FIGS. 6-8.

While double-hull encryption is used extensively for the purpose of illustration, it should be noted that the techniques described herein can be adapted to utilize additional layers of encryption (more than two layers) or other cryptographic protection (e.g., digital signatures). When additional layers of encryption are utilized, negotiation of a hybrid cryptographic scheme will include additional algorithms if more than two algorithms are to be applied to data between a first device and a second device. Consequently, additional keys are exchanged and a more complex key exchange protocol may be required.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

An embodiment illustrating double-hull encryption is described below in conjunction with FIG. 1. Several example embodiments of hybrid key exchange using double-hull encryption are introduced below in conjunction with FIGS. 2-5. Several example embodiments of encryption performed using double-hull encryption are introduced below in conjunction with FIGS. 6-8. The first set of embodiments, set A (FIGS. 2-5), describe various approaches to establishing encryption keys (e.g., negotiating shared secrets between two computing entities, such as between a client and server). The second set of embodiments, set B (FIGS. 6-8), describe various approaches for using encryption keys to perform cryptographic operations. Any embodiment of set A can be combined with any embodiment of set B to perform double-hull encryption. While double-hull encryption is used extensively for the purpose of illustration, it should be noted that the techniques described herein can be adapted to utilize additional layers of encryption (more than two layers) or other cryptographic protection (e.g., digital signatures). For purposes of illustration regarding various embodiments further described in FIGS. 1-8, a computing system is interchangeable with a computing device. A client, client computer, client device, or any other client is type or use of a computing system. A server, server computer, server device, or any other server is a type or use of a computing system. A computing system is interchangeable with computer device.

FIG. 1 illustrates an embodiment wherein a client 102 communicates 108 with a server 114 using a communication channel 108 secured by double-hull encryption 110, 112. First, a client 102, further described below in conjunction with FIG. 10, negotiates a hybrid cryptographic scheme 104 with a server 114, further described below in conjunction with FIG. 10. A hybrid cryptographic scheme is a cryptographic scheme wherein multiple different cryptographic algorithms are utilized. For example, in double-hull encryption as described further herein, a quantum-safe cryptographic algorithm is used in conjunction with a first cryptographic key to encrypt one or more data items by a client 102 or server 114, and a non-quantum-safe cryptographic algorithm is used in conjunction with a second cryptographic key to encrypt the previously encrypted one or more data items.

In the embodiment of FIG. 1, once the hybrid cryptographic scheme is established 104, the client 102 and the server 114 exchange keys, as further described below in conjunction with FIGS. 2-5. Key exchange 106 is generally performed by exchanging a plurality of cryptographic materials between the client and server, and utilizing those cryptographic materials to derive one or more cryptographic keys. Derivation is performed based, at least in part, on cryptographic materials exchanged during a negotiation or handshake of a hybrid cryptographic scheme, but may be performed independently of the negotiation or handshake so long as cryptographic materials are exchanged between a client 102 and a server 114. A handshake verification may be performed once keys have been exchanged 106 to confirm the client 102 and server 114 each derived equivalent keys from exchanged cryptographic materials. Cryptographic keys are derived according to cryptographic materials, and cryptographic keys used to perform encryption operations further described herein are not derived directly from any other cryptographic key used to perform said encryption operations.

The cryptographic materials comprise information used to derive cryptographic keys using a key derivation function. This includes numerical values or other types of information used for generation or derivation of cryptographic keys, such as prime numbers, pseudoprime numbers, hash values, or any other type of information used for cryptographic key derivation. Cryptographic materials may be implemented as sequences of bits used as inputs into cryptographic algorithm, where the specific properties of the sequences depend on the particular algorithms being used. Cryptographic materials, in an embodiment, may be subdivided into two smaller or derived cryptographic materials, where each smaller or derived cryptographic material from a larger cryptographic material may be used individually to derive one or more cryptographic keys.

A cryptographic key is any type of key used to perform a cryptographic operation, such as an encryption key or a decryption key, as well as other types of keys. A cryptographic operation is a transform, such as a mathematical transform, applied to one or more data objects in conjunction with a key. For example, a cryptographic operation is an encryption, decryption, hash, signature, or any other type of cryptographic operation. A type of cryptographic operation is a cryptographic operation, such as an encryption, that is performed with a specific cryptographic algorithm as further described herein. For example, one type of cryptographic operation is an encryption performed with the Advanced Encryption Standard (AES), while another type of the same cryptographic operation is an encryption performed using Rivest-Shamir-Adleman (RSA).

The plurality of keys derived by a client 102 and a server 114 are used to secure data to be communicated 108. An inner encryption 112 is performed using one cryptographic key derived from exchanged cryptographic materials, and an outer encryption is performed using another cryptographic key derived from exchanged cryptographic materials. An inner encryption 112 may be performed using quantum-safe algorithms, as further described below. An outer encryption 110 may be performed using a different encryption algorithm such that the outer encryption 110 conforms to various cryptographic transmission protocols, or can even be performed by various cryptographic transmission protocols, such as TLS.

A key used to perform an inner 112 or outer 110 encryption or decryption is directly derived from exchanged 106 cryptographic materials or a subset of each individual exchanged 106 cryptographic materials. A numerical value immediately or indirectly derived from a key may be used to perform inner 112 or outer 110 encryption or decryption is directly derived from exchanged 106 cryptographic materials. Messages exchanged during communication of data 108 can be based directly on data encrypted by double-hull encryption, or may comprise part or all of data encrypted by double-hull encryption.

Figure 2:
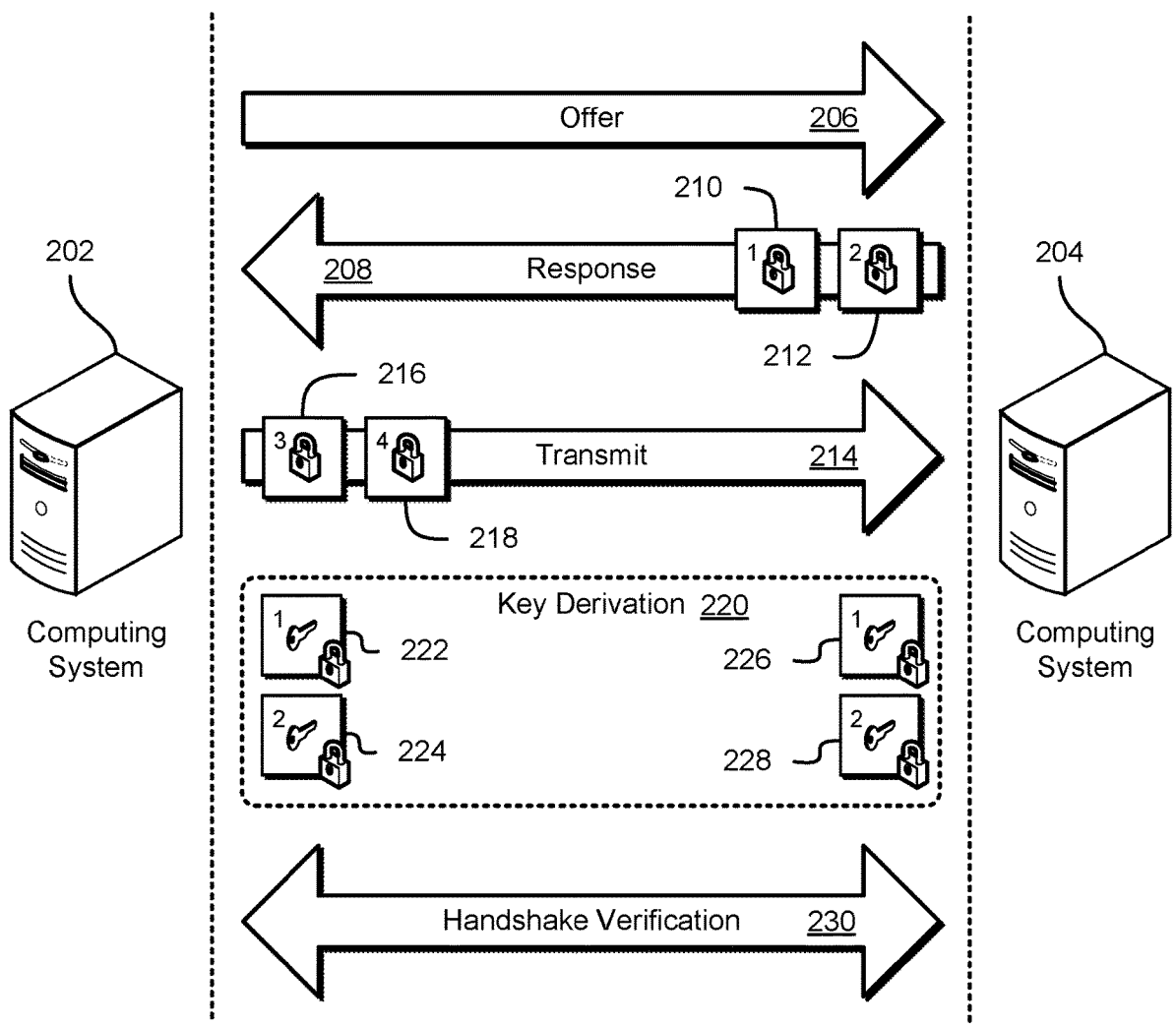
FIG. 2 illustrates an example embodiment wherein a first computing system (a client) negotiates with a second device (a server) to establish a mutual hybrid cryptographic scheme and associated cryptographic keys.

FIG. 2 illustrates example embodiment A-1, wherein a first computing system (a client) 202 negotiates with a second computing system (a server) 204 to establish a mutual hybrid cryptographic scheme and associated cryptographic keys 222, 224, 226, 228. In general, a first computing system 202 negotiates with a second computing system 204 to agree on an explicit hybrid cryptographic scheme to use, and once the explicit hybrid cryptographic scheme has been agreed upon, cryptographic keys are derived 220 by the first computing system 202 and the second computing system 202. Operations of embodiment A-1 include:

1. At a first computing system 202, submit an offer 206 or proposed to a second computing system 204, under a cryptographic transmission protocol, as described below, to use a hybrid cryptographic scheme wherein a first cryptographic algorithm performs an inner encryption of data, and a second cryptographic algorithm performs an outer encryption of data encrypted by the inner encryption.
2. Receive a response 208 from the second computing system 204 agreeing to use the offered 206 or proposed hybrid cryptographic scheme, the response including a first cryptographic material 210 and a second cryptographic material 212. The response 208 may alternatively include a single cryptographic material used to construct or derive a first cryptographic material 210 and a second cryptographic material 212.
3. Transmit 214, by the first computing system 202 to the second computing system 204, a third cryptographic material 216 and a fourth cryptographic material 218. The first computing system 202 may alternatively transmit 214 a single cryptographic material used to construct or derive a third cryptographic material 216 and a fourth cryptographic material 218.
4. Derive 220, by the first computing system 202 and the second computing system 204, a first encryption key 222, 226 for a first cryptographic algorithm based upon the first cryptographic material 210 and the third cryptographic material 216.
5. Derive 220, by the first computing system 202 and the second computing system 204, a second encryption key 224, 228 for a second cryptographic algorithm based upon the second cryptographic material 212 and the fourth cryptographic material 218.
6. Perform a handshake verification 230 between the first computing system 202 and the second computing system 204 confirming agreement for the first encryption key 222, 226 and second encryption key 224, 228.

In an embodiment, one of the first computing system 202 and second computing system 204 is a client (such as described below in connection with FIG. 10) and the other of the first computing system 202 and second computing system 204 is a server (such as described below in connection with FIG. 10). Example cryptographic transmission protocols used in each of steps 1-3 and 6 include, but are not limited to: versions of Transport Layer Security (TLS, such as TLS 1.1, TLS 1.2, and TLS 1.3), IP Security (IPSec), Secure Sockets Layer (SSL), media access control security (MACsec), Secure Shell (SSH), and the security protocols used with broader communication technologies such as WiFi, Bluetooth®, cellular (5G, WiMAX, LTE, CDMA, UMTS, GSM, etc.) and other communications protocols. The offer 206, in an embodiment, is a message comprising data to initiate a handshake of the cryptographic transmissions protocol, such as a ClientHello message in various versions of TLS. The offer 206, in an embodiment, is a message comprising data to renegotiate a session. The offer 206, in an embodiment, is a counter offer to a previous or other offer. The hybrid cryptographic scheme proposed in the offer 206 comprises two or more cryptographic algorithms listed in a list of ciphersuites supported by the first computing system 202. In various embodiments, a hybrid cryptographic scheme is one that uses at least double-hull encryption, wherein an inner encryption or decryption is performed using a first cryptographic algorithm and an outer encryption or decryption is performed using a second cryptographic algorithm.

The response 208, in an embodiment, is one or more messages comprising data, such as a ServerHello message in various versions of TLS. The response 208 indicates agreement on an offered or proposed ciphersuite. In addition, the response 208 provides a first cryptographic material 210 and a second cryptographic material 212, as described herein. Key derivation 220 is a process whereby one or more cryptographic keys 222, 224, 226, 228 are derived by both the first computing system 202 and second computing system 204. In an embodiment, key derivation 220 is a hash function that derives one or more cryptographic keys 222, 224, 226, 228 from cryptographic materials 210, 212, 216, 218. Key derivation 220 is accomplished using any key derivation function supported by cryptographic algorithms mutually decided upon by a first computing system 202 and second computing system 204 as part of a hybrid cryptographic scheme during an offer 206 and response 208.

Handshake verification 230, in an embodiment, is a step whereby a verification is performed to ensure that the first computing system 202 and second computing system 204 have mutually derived 220 identical cryptographic keys 222, 224, 226, 228. Handshake verification 230 may be performed, for example, by a simple exchange of an agreed-upon or predetermined message between the first computing system 202 and second computing system 204. The message is encrypted using one or each of the derived encryption keys 222, 224, 226, 228 by each computing system 202, 204, and sent to the other respective computing system. Each computing system 202, 204 decrypts the received encrypted message into plaintext. If the plaintext does not match the original message, then the key exchange has failed. In an embodiment, the handshake verification 230 confirming agreement on the derived keys 222, 224, 226, 228 by both the first computing system 202 and second computing system 204 is performed by encryption and decryption of a simple predetermined message or data value. If the decrypted message or data value does not match the plaintext that was encrypted, the handshake verification 230 has failed. Otherwise, they keys have been successfully exchanged.

As described above, the first cryptographic material 210 and third cryptographic material 216 are used to facilitate an outer-layer encryption (or second encryption) in a double-hull encryption scheme, while the second cryptographic material 212 and fourth cryptographic material 218 are used to facilitate an inner-layer encryption (or first encryption) in a double-hull encryption scheme. In an embodiment, the first cryptographic material 210 and third cryptographic material 216 are each constructed and/or derived from an individual cryptographic material, where the individual cryptographic material may be larger or equivalent in size to each of the first cryptographic material 210 and third cryptographic material 216. Additionally, in an embodiment, the second cryptographic material 212 and fourth cryptographic material 218 are each constructed or derived from another individual cryptographic material, where the other individual cryptographic material may also be larger or equivalent in size to each of the second cryptographic material 212 and fourth cryptographic material 218.

For example, in an embodiment, if the first cryptographic material 210 and second cryptographic material 212 are each constructed and/or derived from an individual cryptographic material, said individual cryptographic material is a sequence of bits where a first subsequence is or is used to derive or construct the first cryptographic material 210, and a second subsequence is or is used to derive the second cryptographic material 212. Additional cryptographic materials may be derived from the individual cryptographic material using a subsequence for each derived or constructed cryptographic material. Subsequences may be disjoint or interleaved. If the third cryptographic material 216 and fourth cryptographic material 218 are each constructed and/or derived from an individual cryptographic material, said individual cryptographic material is a sequence of bits where a first subsequence is or is used to derive or construct the third cryptographic material 216, and a second subsequence is or is used to derive the fourth cryptographic material 218.

As another example, in an embodiment, an individual cryptographic material is input, along with a first value, into a cryptographic hash function, key derivation, or other function to generate a first cryptographic material 210. The individual cryptographic material is input, along with a second value, into a cryptographic hash function, key derivation, or other function to generate a second cryptographic material 212. The same process is performed using another individual cryptographic material along with a third value and a fourth value to generate a third cryptographic material 216 and a fourth cryptographic material 218. A portion of a cryptographic material is a subset of data in the cryptographic material that is used to generate another cryptographic material. A portion of a cryptographic material, in an embodiment, comprises all of the cryptographic material. In another embodiment, a portion of cryptographic material comprises less than all of the cryptographic material.

The first cryptographic material 210 and third cryptographic material 216 may correspond to either a classical cryptographic scheme or a quantum-safe cryptographic scheme, and the second cryptographic material 212 and fourth cryptographic material 218 may correspond to either a classical cryptographic scheme or a quantum-safe cryptographic scheme (also referred to as a post-quantum scheme), with the present disclosure covering all such combinations.

Each of the cryptographic material pairs (first cryptographic material 210 paired with the third cryptographic material 216, second cryptographic material 212 paired with the fourth cryptographic material 218) may correspond to the same cryptographic scheme or a different cryptographic scheme. In an embodiment, if the first cryptographic material 210 and second cryptographic material 212 are composed or derived from an individual cryptographic material or separate individual cryptographic materials, as described above, the individual cryptographic material from which each of the first cryptographic material 210 and third cryptographic material 216 are composed or derived corresponds to respective cryptographic schemes for each composed or derived cryptographic material. In addition, in an embodiment, if the second cryptographic material 212 and fourth cryptographic material 218 are composed or derived from an individual cryptographic material or separate individual cryptographic materials, as described above, the individual cryptographic material from which each of the second cryptographic material 212 and fourth cryptographic material 218 are composed or derived corresponds to respective cryptographic schemes for each composed or derived cryptographic material.

In an embodiment, the cryptographic schemes are independent from one another so as to prevent leverage of an attack on one from being used on the other. As an illustrative example, the first cryptographic material 210 and third cryptographic material 216 can be cryptographic materials transmitted as part of a Diffie-Hellman key exchange (e.g., an elliptic curve Diffie-Hellman (ECDH) key exchange) and the second cryptographic material 212 and fourth cryptographic material 218 can be cryptographic material transmitted as part of a learning with errors or other (e.g., ring learning with errors) quantum-safe key exchange. Key exchange is quantum-safe if it is resistant to cryptographic attacks using both traditional and quantum computing systems.

The cryptographic materials 210, 212, 216, 218, in an embodiment, are information that can be used to derive cryptographic keys using a key derivation function (which derives one or more secret keys from a secret value). The cryptographic materials 210, 212, 216, 218 may be implemented as sequences of bits used as inputs into cryptographic algorithm, where the specific properties of the sequences depend on the particular algorithms being used, some of which are listed herein.

The first cryptographic material 210 and third cryptographic material 216 can be used to derive 220 a first cryptographic key 222, 226, such as in accordance with a protocol described in NIST, Special Publication 800-56A, Recommendation for Pair-Wise Key Establishment Schemes Using Discrete Logarithm Cryptography, March, 2006. The first cryptographic key 222, 226 may be used for a session key by the cryptographic transmission protocol, such as by being the session key itself or being used as an input to derive a session key. The key derivation 220 function used for the second cryptographic material 212 and fourth cryptographic material 218 is used to derive 220 a second encryption key 224, 228, and may be the same as or otherwise similar to the key derivation 220 function used for the first cryptographic material 210 and third cryptographic material 216. Alternatively, the key derivation 220 function may be the same, but with different parameters. Key derivation 220 operations are performed independently on a first computing system 202 and second computing system 204 using the established cryptographic materials 210, 212, 216, 218. Example key agreement algorithms that can be used for derivation 220 of the first cryptographic key 222, 226 and/or second cryptographic key 224, 228 are: BIKE, Classic McEliece, CRYSTALS-KYBER, FrodoKEM, HQC, LAC, LEDAcrypt, NewHope, NTRU, NTRU Prime, NTS-KEM, ROLLO, Round5, RQC, SABER, SIKE, Three Bears, and others such post-quantum algorithms.

Figure 3:
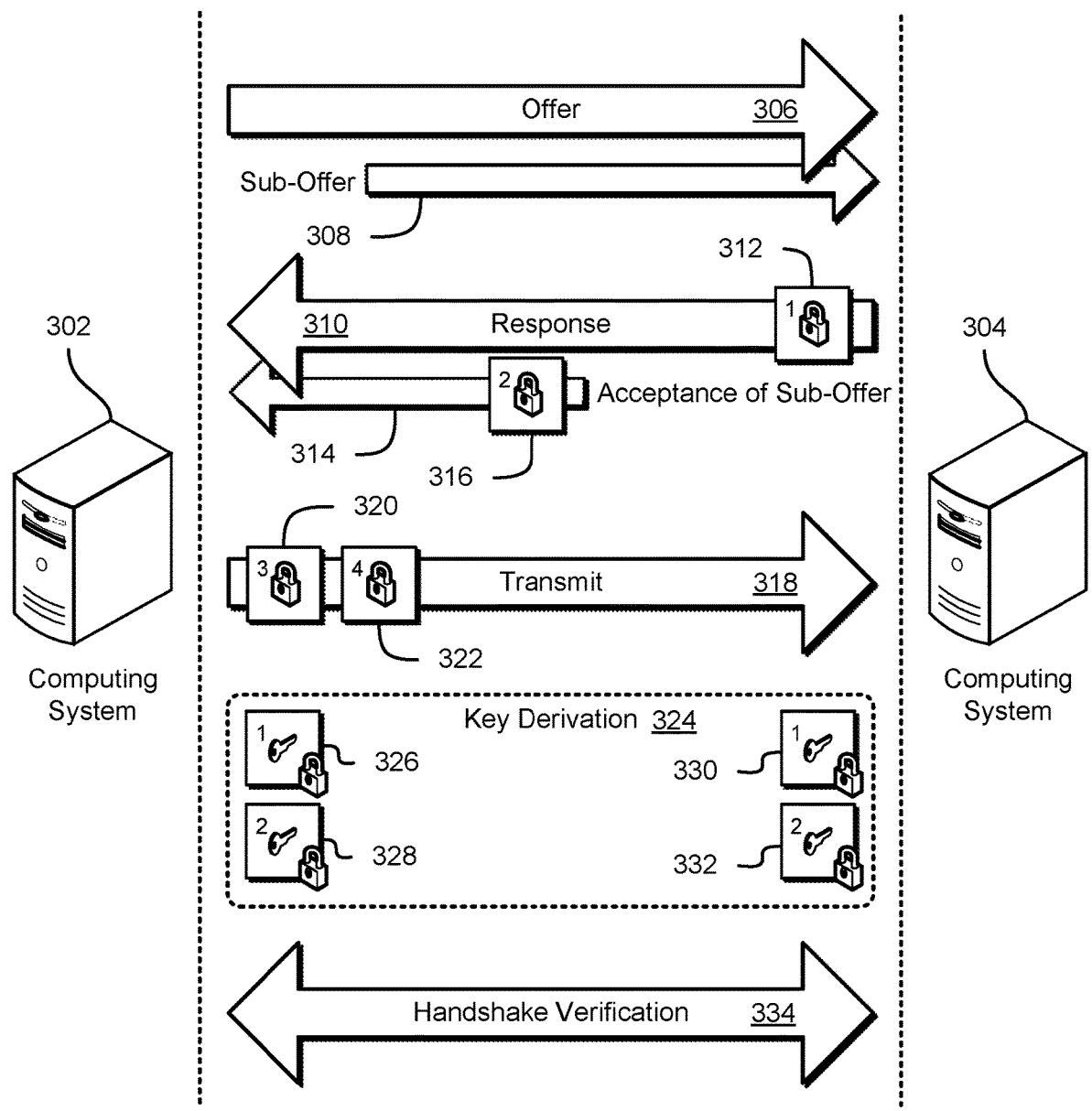
FIG. 3 illustrates an example embodiment wherein a first computing system (a client) negotiates with a second computing system (a server) to establish a mutual hybrid cryptographic scheme based on one or more proposed cryptographic schemes, and then derives cryptographic keys based, at least in part, on the established mutual hybrid cryptographic scheme.

FIG. 3 illustrates example embodiment A-2, wherein a first computing system (a client) 302 negotiates with a second computing system (a server) 304 to establish a mutual hybrid cryptographic scheme based on one or more proposed 306, 308 cryptographic schemes, and then derives 324 cryptographic keys 326, 328, 330, 332 based, at least in part, on the established mutual hybrid cryptographic scheme. In embodiment A-2, a first computing system 302 negotiates with a second computing system 304 to agree on an out-of-band hybrid cryptographic scheme to use. An out-of-band hybrid cryptographic scheme, in an embodiment, is a hybrid cryptographic scheme wherein one or more cryptographic materials are exchanged outside of regular communication of cryptographic materials. A key exchange through key derivation 324 is performed once the hybrid cryptographic scheme has been agreed upon. Operations of embodiment A-2 include:

1. At a first computing system 302, transmit an offer 306, as described above in conjunction with FIG. 2, to a second computing system 304 under a cryptographic transmission protocol. The offer 306 is a proposal to use a first cryptographic scheme and includes in the offer 306 a sub-offer 308 specifying to use a second cryptographic scheme.
2. Receive, from the second computing system 304, a response 310 agreeing to use the first cryptographic scheme, the response 310 including a first cryptographic material 312 and an acceptance of the sub-offer 314, the acceptance of the sub-offer 314 including a second cryptographic material 316. The response 310 and acceptance of the sub-offer 314 may alternatively include a single cryptographic material used to construct or derive a first cryptographic material 312 and a second cryptographic material 316.
3. Transmit 318 to the second computing system 304 a third cryptographic material 320 and a fourth cryptographic material 322. The first computing system 302 may alternatively transmit 318 a single cryptographic material used to construct or derive a third cryptographic material 320 and a fourth cryptographic material 322.
4. Derive 324, by both the first computing system 302 and second computing system 304, a first encryption key 326, 330 based upon the first cryptographic material 312 and the third cryptographic material 320.
5. Derive 324, by both the first computing system 302 and second computing system 304, a second encryption key 328, 332 based upon the second cryptographic material 316 and the fourth cryptographic material 322.
6. Perform a handshake verification 334 between the first computing system 302 and the second computing system 304 confirming agreement for the first encryption key 326, 330 and the second encryption key 328, 332.

The offer 306, in an embodiment, is a message comprising data to initiate a handshake of the cryptographic transmission protocol, such as a ClientHello message in various versions of TLS. The sub-offer 308, in an embodiment, is one or more data components of the offer 306. The cryptographic scheme offer and sub-offer may be specified in an extension field of the ClientHello message, for example, when TLS is used as a cryptographic transmission protocol. The cryptographic schemes specified in the offer 306 and sub-offer 308 are pre-established as being supported by both the first computing system 302 and second computing system 304, as described above in conjunction with FIG. 2.

In an embodiment, the response 310 provided by the second computing system 304 comprises a response 310 message, as described above in conjunction with FIG. 2, for both the offer 306 and sub-offer 308. The response 310 includes a first cryptographic material 312, and the acceptance of the sub-offer 314 includes a second cryptographic material 316. Key derivation 324 and handshake verification 334 are performed as described above in conjunction with FIG. 2.

Figure 4:
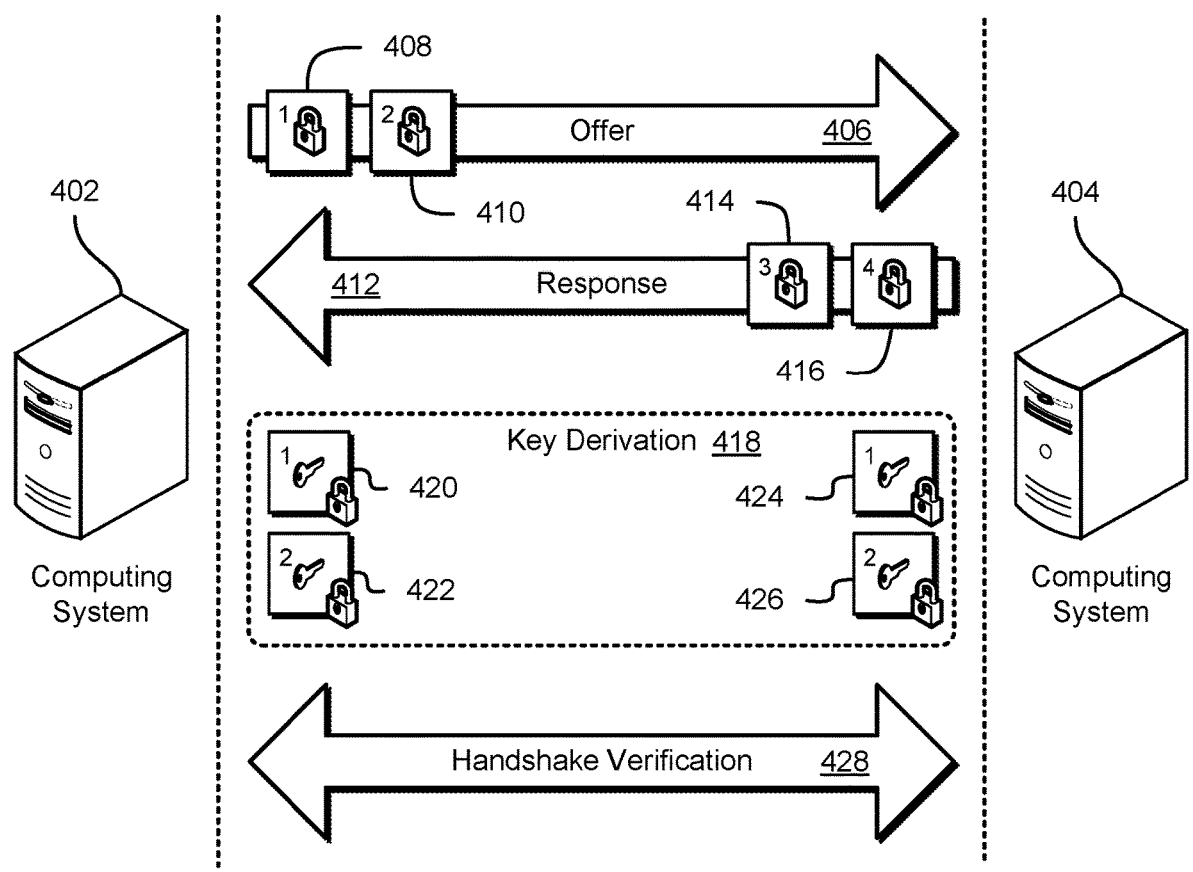
FIG. 4 illustrates an example embodiment wherein a first computing system (a client) negotiates with a second computing system (a server) to establish a mutual hybrid cryptographic scheme by performing an initial exchange of cryptographic materials, and then derives cryptographic keys based, at least in part, on the initially-exchanged cryptographic materials.

FIG. 4 illustrates example embodiment A-3, wherein a first computing system (a client) 402 negotiates with a second computing system (a server) 404 to establish a mutual hybrid cryptographic scheme by performing an initial exchange 406, 412 of cryptographic materials 408, 410, 414, 416, and then derives 418 cryptographic keys 420, 422, 424, 426 based, at least in part, on the initially-exchanged cryptographic materials 408, 410, 414, 416. In embodiment A-3, a first computing system 402 negotiates with a second computing system 404 to agree on an explicit hybrid cryptographic scheme to use with an up-front exchange of cryptographic materials 408, 410 that does not wait for the hybrid cryptographic scheme to first be established. Operations of embodiment A-3 include:

1. At a first computing system 402, submit an offer 406 to a second computing system 404, under a cryptographic transmission protocol as described above in conjunction with FIG. 2, to use a proposed hybrid cryptographic scheme including at least a first cryptographic material 408 and a second cryptographic material 410. The first computing system 402 may alternatively submit an offer 406 including a single cryptographic material used to construct or derive a first cryptographic material 408 and a second cryptographic material 410.
2. Receive a response 412 from the second computing system 404 agreeing to use the proposed hybrid cryptographic scheme, where the response 412 includes a third cryptographic material 414 and a fourth cryptographic material 416. The response 412 may alternatively include a single cryptographic material used to construct or derive a third cryptographic material 414 and a fourth cryptographic material 416.
3. Derive 418, by the first computing system 402 and the second computing system 404, a first encryption key 420, 424 based upon the first cryptographic material 408 and the third cryptographic material 414
4. Derive 418, by the first computing system 402 and the second computing system 404, a second encryption key 422, 426 based upon the second cryptographic material 410 and the fourth cryptographic material 416.
5. Perform a handshake verification 428 between the first computing system 402 and second computing system 404 to confirm agreement for the first encryption key 420, 424 and second encryption key 422, 426.

Embodiment A-3 of FIG. 4 comprises one fewer operations or communication steps when compared with embodiment A-2 of FIG. 3 or embodiment A-1 of FIG. 2. Cryptographic materials 408, 410 are sent with the offer 406 by the first computing system 402 and cryptographic materials 414, 416 are received in a response 412 to the offer establishing a hybrid cryptographic scheme from the second computing system 404. In combining exchange of cryptographic materials 408, 410, 414, 416 with negotiation of a hybrid cryptographic scheme, a round of communication is eliminated.

Figure 5:
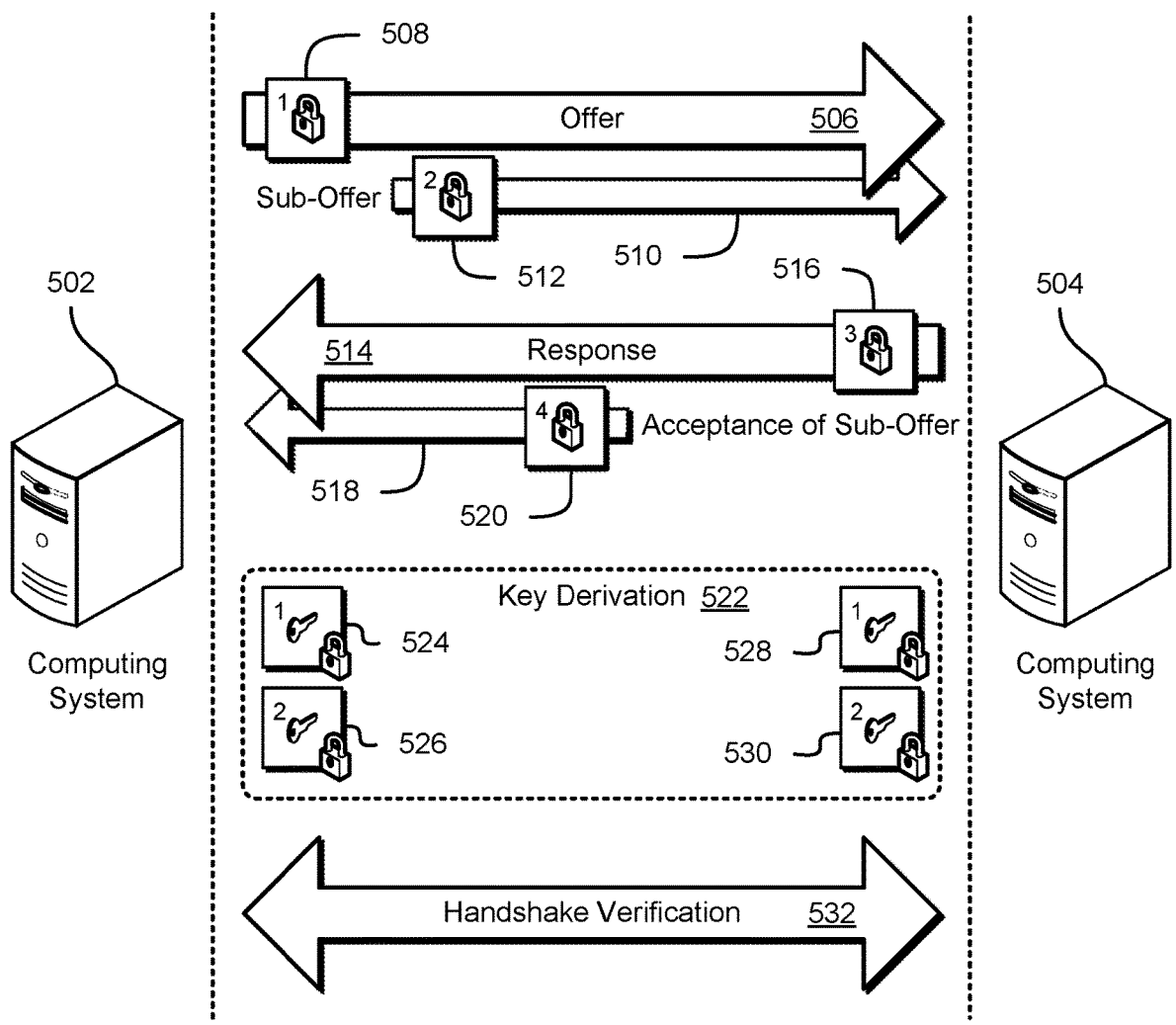
FIG. 5 illustrates an example embodiment wherein a first computing system (a client) negotiates with a second computing system (a server) to establish an out-of-band hybrid cryptographic scheme by performing an initial exchange of cryptographic materials combined with an offer for a first cryptographic scheme as well as a sub-offer for a second cryptographic scheme, and then derives cryptographic keys based, at least in part, on the cryptographic materials.

FIG. 5 illustrates example embodiment A-4, wherein a first computing system (a client) 502 negotiates with a second computing system (a server) 504 to establish an out-of-band hybrid cryptographic scheme by performing an initial exchange of cryptographic materials 508, 512 combined with an offer 506 for a first cryptographic scheme as well as a sub-offer 510 for a second cryptographic scheme, and then derives 522 cryptographic keys 524, 526, 528, 530 based, at least in part, on the cryptographic materials 508, 512, 516, 520. In embodiment A-4, a first computing device 502 negotiates with a second computing device 504 to agree on an out-of-band hybrid cryptographic scheme, as described above in conjunction with FIG. 3, to use with an up-front exchange of cryptographic materials 508, 512 that does not wait for the hybrid cryptographic scheme to first be established. Operations of embodiment A-4 include:

1. At a first computing system 502, submit an offer 506 to a second computing system 504, under a cryptographic transmission protocol as described above in conjunction with FIG. 2, to use a first proposed cryptographic scheme including a first cryptographic material 508. In addition, a sub-offer 510 specifying to use a second proposed cryptographic scheme is submitted with the offer 506, wherein the sub-offer 510 includes a second cryptographic material 512. The first computing system 502 may alternatively submit an offer 506 and sub-offer 510 including a single cryptographic material used to construct or derive a first cryptographic material 508 and a second cryptographic material 512.
2. Receive a response 514 from the second computing system 504 agreeing to use the first proposed hybrid cryptographic scheme, the response 514 including a third cryptographic material 516. In addition, an acceptance of the sub-offer 518 is submitted to the first computing system 502 in conjunction with the response 514 including a fourth cryptographic material 520. The response 514 and acceptance of the sub-offer 518 from the second computing system 504 may alternatively include a single cryptographic material used to construct or derive a third cryptographic material 516 and a fourth cryptographic material 520.
3. Derive 522, by the first computing system 502 and the second computing system 504, a first encryption key 524, 528 based on the first cryptographic material 508 and the third cryptographic material 516.
4. Derive 522, by the first computing system 502 and the second computing system 504, a second encryption key 526, 530 based upon the second cryptographic material 512 and the fourth cryptographic material 520.
5. Perform a handshake verification 532 between the first computing system 502 and the second computing system 504 to confirm agreement for the first encryption key 524, 528 and the second encryption key 526, 530.

In conjunction with the embodiments of set A (FIGS. 2-5), the embodiments of set B (FIGS. 6-8) describe various approaches for using encryption keys, as described above in conjunction with FIG. 2, to perform cryptographic operations. Each embodiment of set B, as illustrated in FIGS. 6-8, can be used with any one of the embodiments of set A, as illustrated in FIGS. 2-5.

Figure 6:
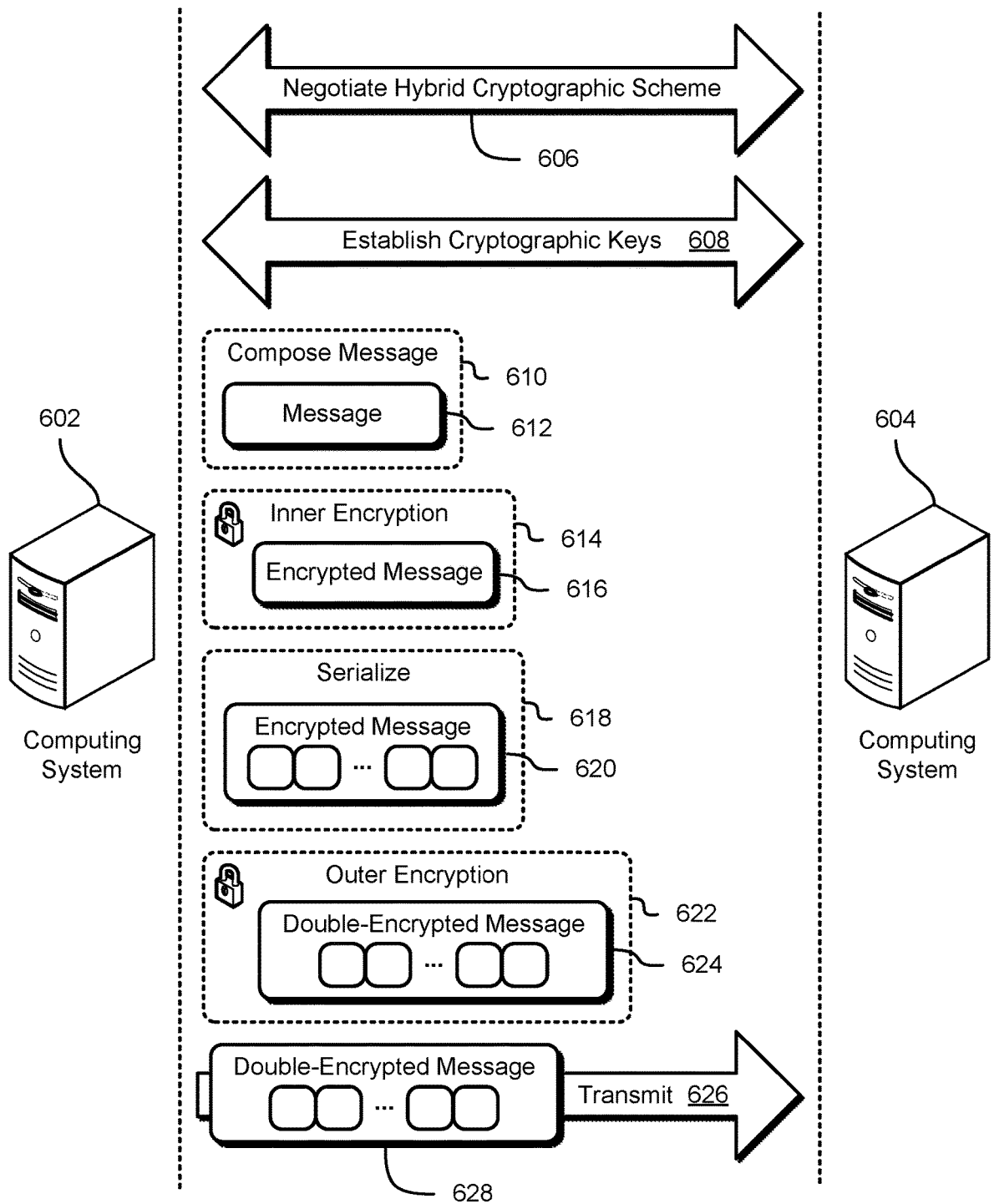
FIG. 6 illustrates an example embodiment wherein a first computing system (a client) composes a message, performs a cryptographic operation on the message with a first cryptographic key derived in accordance with a hybrid cryptographic scheme, serializes the message according to a cryptographic transmission protocol into blocks, and performs the cryptographic operation on each block with a second cryptographic key derived in accordance with the hybrid cryptographic scheme.

FIG. 6 illustrates example embodiment B-1, wherein a first computing system (a client) 602 composes 610 a message 612, performs a cryptographic operation, such as encryption 614, on that message 612 with a first cryptographic key derived in accordance with a hybrid cryptographic scheme, serializes 618 the cryptographically protected message 616 according to a cryptographic transmission protocol described herein into blocks, and performs the cryptographic operation, such as encryption 622, on each block with a second cryptographic key derived in accordance with the hybrid cryptographic scheme. In embodiment B-1, an application message 612 comprising data in a single communication channel is twice (or double) cryptographically protected 614, 622 using the cryptographic keys established by any one of the embodiments of set A. Operations of embodiment B-1 include:

1. Agree upon using a hybrid cryptographic scheme 602 and a cryptographic transmission protocol between a first computing node and a second computing node using any one of the embodiments of set A.
2. Establish 608 a first cryptographic key and a second cryptographic key accessible by the first computing system 602 and second computing system 604 using the embodiment of set A from operation (step) 1.
3. At the first computing system 602, compose 610 an application message 612.
4. Perform an inner cryptographic operation, such as an encryption 614, by cryptographically protecting the application message 612 using the first cryptographic key to produce a cryptographically protected application message (encrypted application message 616).
5. Serialize (chunk and frame) 618 the cryptographically protected application message (encrypted application message 616) into one or more message frames comprising cryptographically protected data (encrypted data 620) using the cryptographic transmission protocol, including at least an initial message frame.
6. Perform an outer cryptographic operation, such as encryption 622, by cryptographically protecting the body of the initial message frame from the one or more message frames comprising cryptographically protected data (encrypted data 620) using the second cryptographic key to produce a double-protected message (double-encrypted message 624) comprising the initial message frame.
7. Transmit 626 the double-protected message (double-encrypted message 624) frame comprising the one or more cryptographically protected message frames to the second computing system 604.
8. Repeat operations 6 and 7 for each frame in the one or more message frames comprising cryptographically protected data (encrypted data 620).

In an embodiment, operations 1 (606) and 2 (608) of set B (FIGS. 6-8) are performed according to the embodiments of set A (FIGS. 2-5). Any of the embodiments in set A (FIGS. 2-5) may be used to satisfy operations 1 and 2 of each embodiment of set B (FIGS. 6-8).

The application message 612, in an embodiment, is an arbitrary stream of bytes of an arbitrary length. The application message 612, in an embodiment, is any kind of datum comprising an arbitrary stream of bytes of an arbitrary length. A datum is a unit of information, such as data. For example, in an embodiment, a datum is one or more bytes comprising character values. The application message 612 is encrypted with a first cryptographic key, which has been derived from a first cryptographic material and third cryptographic material as described above in conjunction with FIGS. 2-5. There are no structural requirements placed on the application message 612. The application message 612 is split up or serialized 618 into frames according to the maximum record size required by a cryptographic transmission protocol (e.g. TLS, SSL, SSH, etc.) used to facilitate embodiment B-1. The cryptographically protected application message frames 620 are doubly or twice cryptographically protected (such as by an outer layer of encryption) using a second cryptographic key, where the second cryptographic key was derived from a second cryptographic material and a fourth cryptographic material, as described above in conjunction with FIGS. 2-5.

Figure 7:
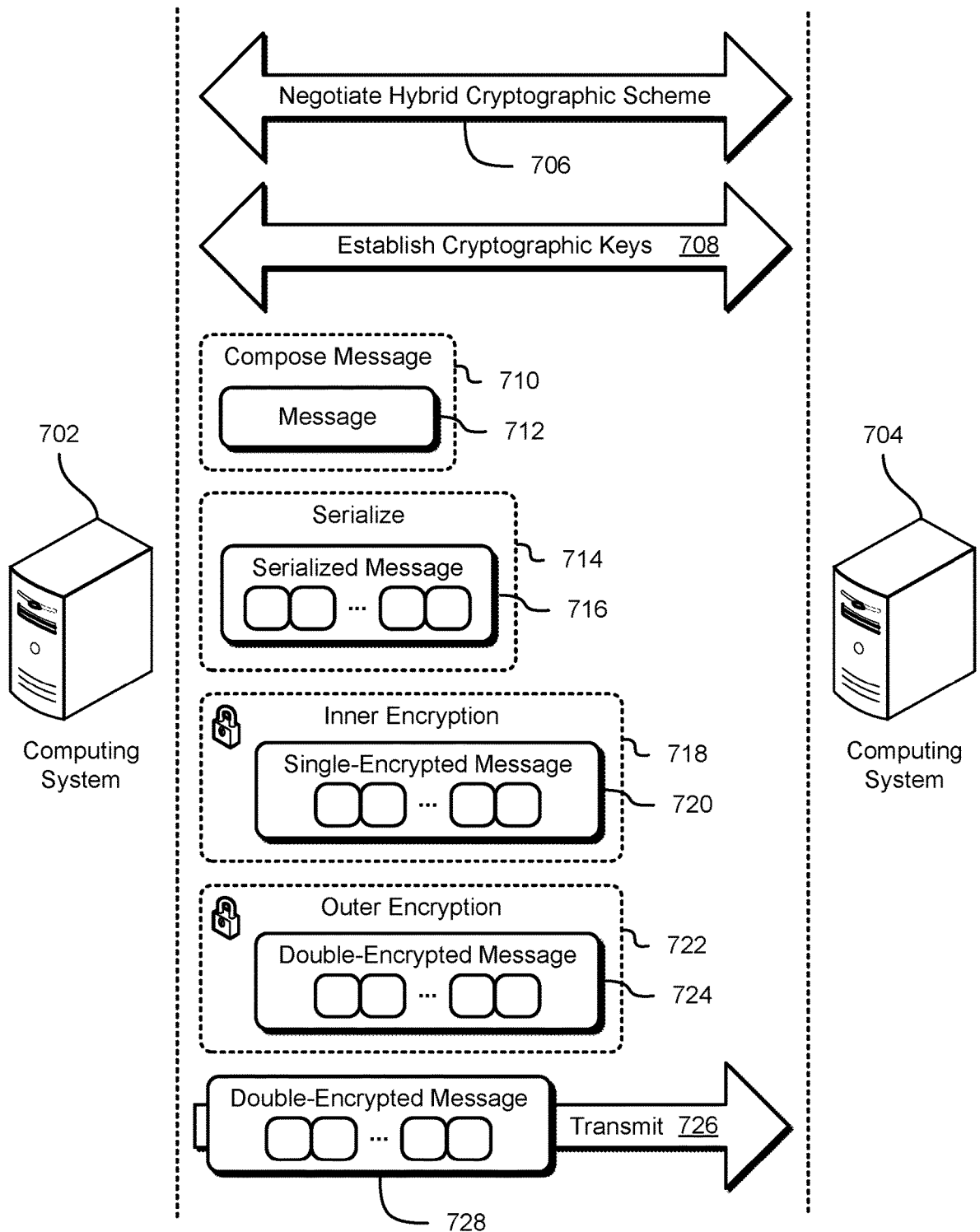
FIG. 7 illustrates an example wherein a first computing system (a client) composes a message, serializes the message, and performs a cryptographic operation on the message first with a first cryptographic key and second with a second cryptographic key, each key derived in accordance with a hybrid cryptographic scheme.

FIG. 7 illustrates example embodiment B-2, wherein a first computing system (a client) 702 composes a message 712, serializes 714 the message 712, and cryptographically protects 718, 722 the serialized message 716 by performing a first (inner) cryptographic operation, such as encryption 718, with a first cryptographic key and a second (outer) cryptographic operation, such as encryption 722, with a second cryptographic key, where each key is derived in accordance with a hybrid cryptographic scheme described above in FIGS. 2-5. In embodiment B-2, an application message 712 in a single communication channel is double-protected (e.g., double-encrypted) using cryptographic keys established using any one of the embodiments of set A (FIGS. 2-5). Operations of embodiment B-2 include:

1. Agree upon using a hybrid cryptographic scheme 706 and a cryptographic transmission protocol between a first computing system 702 and a second computing system 704.
2. Establish 708 a first cryptographic key and a second cryptographic key accessible by the first computing system 702 and second computing system 704.
3. At the first computing system 702, compose 710 an application message 712.
4. Serialize (chunk and frame) 714 the application message 714 into a serialized message 716 comprising one or more message frames using the cryptographic transmission protocol, including at least an initial message frame.
5. Perform an inner cryptographic operation, such as an encryption 718, by cryptographically protecting the body of the initial message frame (of the serialized message 716) using the first cryptographic key to produce a single-cryptographically protected message (single-encrypted message 720) comprising at least a cryptographically protected message record.
6. Perform an outer cryptographic operation, such as an encryption 722, by cryptographically protecting the body of the cryptographically protected message record (single-encrypted message 720) using the second cryptographic key to produce a double-cryptographically protected message record (double-encrypted message 724).
7. Transmit 726 the double-cryptographically protected message record (double-encrypted message 728) to the second computing system 704.
8. Repeat operations 5-7 for each message frame in the serialized message 716.

In an embodiment, the application message 712 of arbitrary composition and length is divided or serialized 714 into a serialized message 716 comprising message frames according to the record limitations of the cryptographic communication protocol being used. Each frame is first cryptographically protected by performing an inner cryptographic operation, such as an encryption 718, using the first cryptographic key derived in conjunction with any one of the embodiments of set A (FIGS. 2-5) described above. Each frame is then second (double) cryptographically protected by performing an outer cryptographic operation, such as an encryption 722, using a second cryptographic key derived in conjunction with any one of the embodiments of set A (FIGS. 2-5) described above, although different orders of cryptographic operations are considered as being within the scope of the present disclosure.

Figure 8:
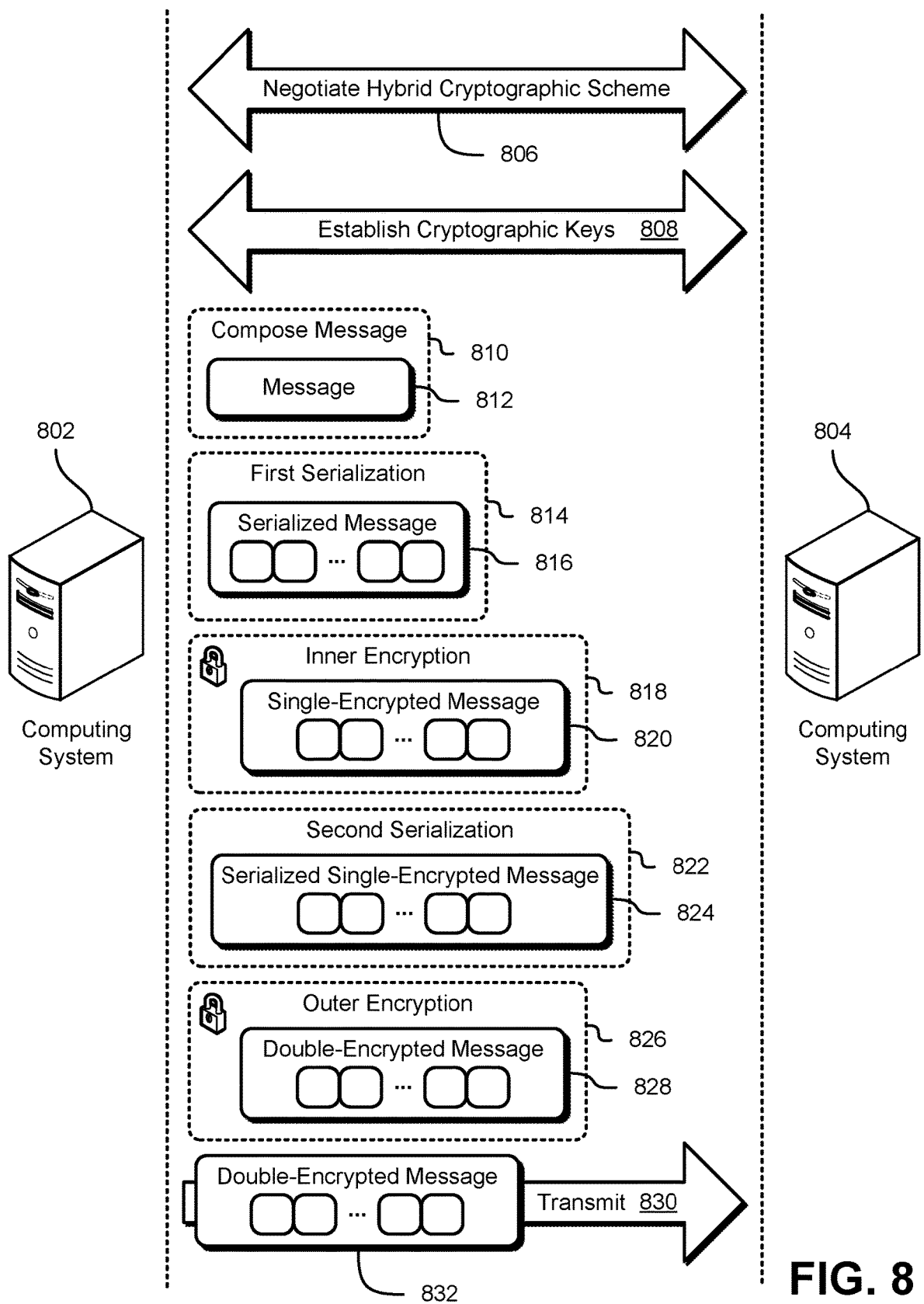
FIG. 8 illustrates an example embodiment wherein a first computing system (a client) composes a message and transmits a cryptographically protected message to a second device (a server) using multiple serializations, where message data is cryptographically protected by a cryptographic operation between each stage of serialization using cryptographic keys derived in accordance with a hybrid cryptographic scheme.

FIG. 8 illustrates example embodiment B-3, where a first computing system (a client) 802 composes 810 a message 812 and transmits 830 a cryptographically protected message to a second device (a server) 804 using multiple data serializations 814, 822, where message 812 data is cryptographically protected by a cryptographic operation 818, 826 between each stage of serialization 814, 826 using cryptographic keys derived in accordance with a hybrid cryptographic scheme. In embodiment B-3, an application message 812 in a tunneled or cryptographic communication channel is double-encrypted using cryptographic keys established by any one of the embodiments of set A, as described above in conjunction with FIGS. 2-5. Operations of embodiment B-2 include:

1. Agree upon using a hybrid cryptographic scheme 806, a first cryptographic transmission protocol, and a second cryptographic transmission protocol between a first computing system 802 and a second computing system 804.
2. Establish 808 a first encryption key and a second encryption key accessible by the first computing system 802 and second computing system 804.
3. At the first computing system 802, compose 810 an application message 812.
4. Perform a first serialization 814 by dividing the application message 812 into a first one or more message frames (serialized message) 816 using the first cryptographic transmission protocol.
5. Perform an inner cryptographic operation, such as an encryption 818, by cryptographically protecting each of the first one or more message frames (serialized message) 816 using a first cryptographic key to produce one or more cryptographically protected message records (single-encrypted message) 820.
6. Perform a second serialization 822 by dividing the one or more cryptographically protected message records (single-encrypted message) 820 into a second one or more message frames (serialized single-encrypted message) 824 using the second cryptographic transmission protocol, including at least an initial message frame.
7. Perform an outer cryptographic operation, such as an encryption 826, by cryptographically protecting the body of the initial message frame of the second one or more message frames (serialized single-encrypted message) 824 using a second cryptographic key to produce a tunneled message record (double-encrypted message) 828.
8. Transmit 830 the tunneled message record (double-encrypted message) 832 to the second computing system.
9. Repeat operations 7 and 8 for each message frame in the second one or more message frames (serialized single-encrypted message) 824.

In an embodiment, a second cryptographic transmission protocol (e.g. TLS, SSH, SSL, etc.) is selected in conjunction with the key exchange 802 embodiments of set A (FIGS. 2-5). An application message 812 of arbitrary composition and of arbitrary length is created or composed 810 by a first computing system 802. The message 812 is then divided or serialized 814 into one or more records (serialized message) 816 according to the maximum record size of the first cryptographic transmission protocol. Each record in a serialized message 816 is cryptographically protected, such as by performing an encryption (inner encryption 818), using a first cryptographic key established in conjunction with any one embodiment of set A (FIGS. 2-8). The cryptographically protected records (single-encrypted message) 820 are further divided or serialized by a second serialization 822 into frames or message records (serialized single-encrypted message) 824 according to the record size of the second cryptographic transmission protocol. Each record or frame in the serialized single-encrypted message 824 is cryptographically protected, such as by an outer encryption 826, using a second cryptographic key established in conjunction with any one embodiment of set A (FIGS. 2-8).

As one skilled in the art will appreciate in light of this disclosure, certain embodiments may be capable of achieving certain advantages, including some or all of the following: (1) A double-hull encryption is performed using two keys that were negotiated using a single handshake, and (2) by using a double-hull encryption, a non-standards-compliant inner quantum-safe cryptographic operation may be performed in conjunction with a standards-compliant classical outer cryptographic operation in order to achieve both quantum-safe strength as well as standards compliance. As described above, various mechanisms provide for negotiating two or more keys using a single handshake by transmitting sufficient cryptographic materials for two (or more) keys during the handshake in various ways (e.g., in a single handshake message, in multiple handshake messages, utilizing various fields of handshake messages, and the like).

Figure 9:
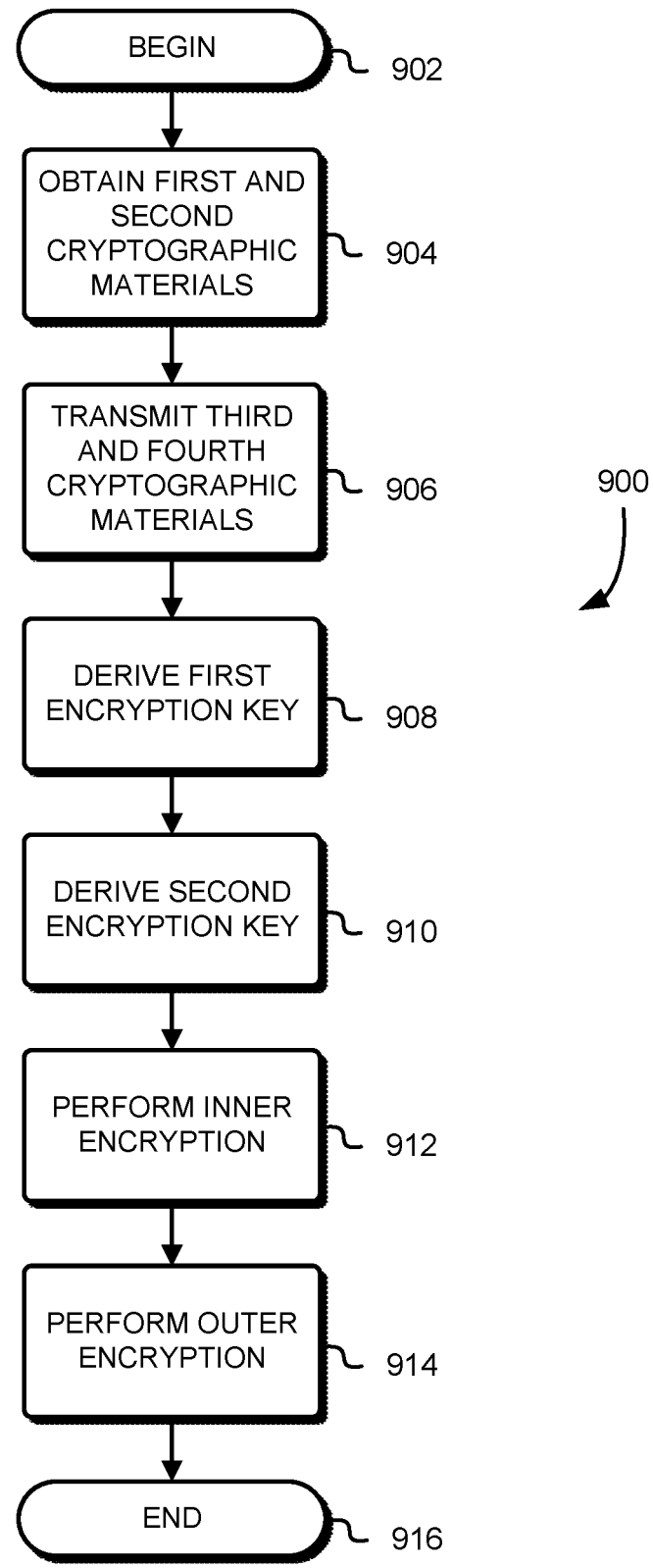
FIG. 9 illustrates an example process for performing double-hull encryption in accordance with various embodiments described herein.

FIG. 9 illustrates an example process 900 for performing double-hull encryption in accordance with various embodiments described above in conjunction with FIGS. 2-8. In an embodiment, in the process 900, the system begins 902 by obtaining a first and second cryptographic materials 904 from another system, and then transmitting a third and fourth cryptographic materials to the other system 906. This can be done, for example, according to the techniques described above corresponding to embodiments A-1, A-2, A-3, and/or A-4. The system then uses each cryptographic material to derive a first encryption key 908 and a second encryption key 910, which can also be done, for example, according to the techniques described above corresponding to embodiments A-1, A-2, A-3, and/or A-4. The system uses the first derived encryption key 908 and the second derived encryption key 910 to perform an inner encryption 912 and an outer encryption 914. The inner encryption 912 and outer encryption 914 can be done, for example, in accordance with the techniques described above corresponding to embodiments B-1, B-2, and/or B-3, and used in combination with any of the techniques described above in connection with embodiments A-1, A-2, A-2, and/or A-4. Once the data has been encrypted using an inner encryption 912 and an outer encryption 914, the example process 900 ends 916.

Figure 10:
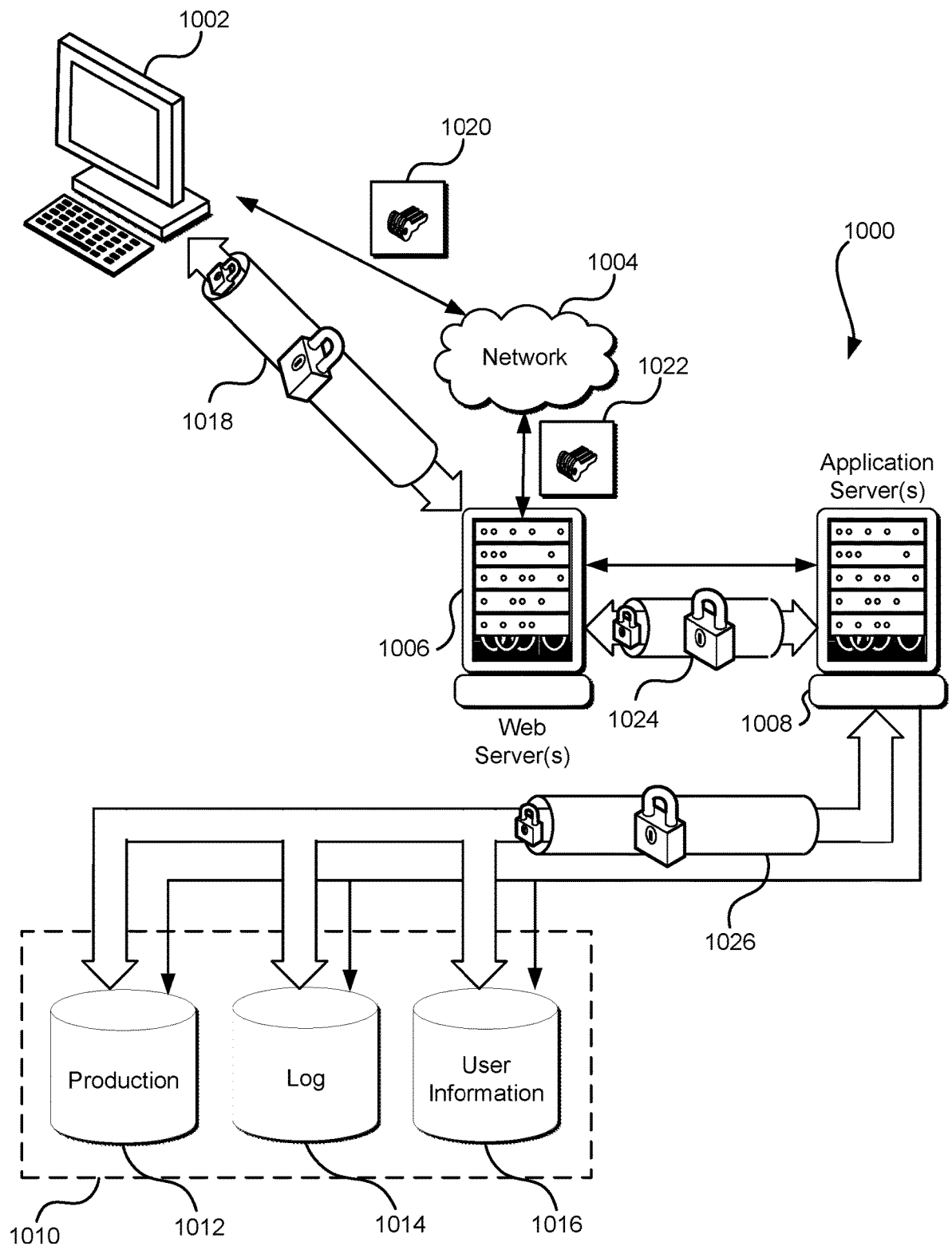
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes transmission of first and second cryptographic materials 1022 over a network 1004 from a server 1006 to a client 1002. Transmission of a third and fourth cryptographic materials 1020 is performed over a network 1004 from client 1002 to server 1006. A double-encrypted communication tunnel 1018 or hybrid cryptographic communication session is established between client 1002 and server 1006 over a network 1004 after the key exchange is completed according to an embodiment described above. A double-encrypted communication tunnel 1024 or hybrid cryptographic communication session may also be established between web server(s) 1006 and application server(s) 1008. A double-encrypted communication tunnel 1026 or hybrid cryptographic communication session may also be stablished between application server(s) 1008 and a data store 1010.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members.

Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    at a first system, performing a handshake with a second system to establish a cryptographically protected communications session, the handshake comprising:
        obtaining, from the second system, a first cryptographic material and a second cryptographic material;
        transmitting, to the second system, a third cryptographic material and a fourth cryptographic material to allow the second system to derive a first encryption key based on the first cryptographic material and the third cryptographic material and to derive a second encryption key based on the second cryptographic material and the fourth cryptographic material;

deriving the first encryption key based on the first cryptographic material and the third cryptographic material;
deriving the second encryption key based on the second cryptographic material and the fourth cryptographic material;
using the first encryption key to encrypt data to obtain first encrypted data;
using the second encryption key to encrypt the first encrypted data to obtain second encrypted data; and
transmitting a message over the cryptographically protected communications session, the message being based on the second encrypted data,
wherein the cryptographically protected communication session is a hybrid cryptographically protected communication session and wherein the first encryption key corresponds to a first cryptographic algorithm and the second encryption key corresponds to a second cryptographic algorithm.

2. The computer-implemented method of claim 1, wherein the first cryptographic material and the second cryptographic material is transmitted, by the second system, to the first system in response to a first message from the first system to the second system identifying a first cryptographic algorithm and a second cryptographic algorithm.

3. The computer-implemented method of claim 1, wherein the first system transmits a first message identifying a first cryptographic algorithm to the second system and a second message identifying a second cryptographic algorithm to the second system, and the second system transmits the first cryptographic material to the first system in response to the first message and a second cryptographic material to the first system in response to the second message.

4. The computer-implemented method of claim 1, wherein the first system transmits, to the second system, a first message comprising the third cryptographic material and the fourth cryptographic material, the first message identifying a first cryptographic algorithm and a second cryptographic algorithm, and receiving, in response to the first message, a second message from the second system comprising the first cryptographic material and the second cryptographic material.

5. The computer-implemented method of claim 1, wherein:
the first system transmits a first message comprising the third cryptographic material to the second system, the first message identifying a first cryptographic algorithm;
the first system transmits a second message comprising the fourth cryptographic material to the second system, the second message identifying a second cryptographic algorithm;
in response to the first message indicating the first cryptographic algorithm, the second system transmits the first cryptographic material to the first system; and
in response to the second message indicating the second cryptographic algorithm, the second system transmits the second cryptographic material to the first system.

6. A system, comprising:
one or more processors; and
memory that stores computer-executable instructions that are executable to cause the one or more processors to:
establish a cryptographically protected communications session by at least:
obtaining, from another system, a first cryptographic material;
transmitting, to the other system, a second cryptographic material to allow the other system to derive a first cryptographic key based on the first cryptographic material and the second cryptographic material and to derive a second cryptographic key based on the first cryptographic material and the second cryptographic material;
derive the first cryptographic key based on the first cryptographic material and the second cryptographic material and derive the second cryptographic key based on the first cryptographic material and the second cryptographic material;
perform a cryptographic operation on a datum using the first cryptographic key to create a first cryptographically protected datum;
perform another cryptographic operation on the cryptographically protected datum using the second cryptographic key to create a second cryptographically protected datum; and
transmit the second cryptographically protected datum over the cryptographically protected communications session,
wherein the first encryption key corresponds to a first cryptographic algorithm and the second encryption key corresponds to a second cryptographic algorithm.

7. The system of claim 6, wherein the cryptographic operation on the datum using the first cryptographic key is a first type of encryption operation and the other cryptographic operation on the cryptographically protected datum using the second cryptographic key is a second type of encryption operation.

8. The system of claim 6, wherein the instructions that cause the system to establish a cryptographically protected communications session are executable to cause the system to obtain, from the other system, the first cryptographic material in response to a first message transmitted from the system to the other system, the first message comprising information about a first cryptographic algorithm and information about a second cryptographic algorithm.

9. The system of claim 6, wherein the instructions that cause the system to establish a cryptographically protected communications session are executable to cause the system to obtain, from the other system, a first portion of the first cryptographic material in response to a first message transmitted by the system to the other system, the first message comprising information about a first cryptographic algorithm, and a second portion of the first cryptographic material in response to a second message transmitted by the system to the other system, the second message comprising information about a second cryptographic algorithm.

10. The system of claim 6, wherein the instructions that cause the system to establish a cryptographically protected communications session are executable to cause the system to transmit, to the other system, a first message comprising the second cryptographic material, the first message indicating a first cryptographic algorithm and a second cryptographic algorithm and, in response to the first message, the system obtains from the other system a response comprising the first cryptographic material.

11. The system of claim 6, wherein the instructions that cause the system to establish a cryptographically protected communications session are executable to cause the system to:
obtain, from the other system, a first portion of the first cryptographic material in response to a first message transmitted by the system to the other system, the first message comprising a first portion of the second cryptographic material and information about a first cryptographic algorithm; and obtain, from the other system, a second portion of the first cryptographic material in response to a second message transmitted by the system to the other system, the second message comprising a second portion of the second cryptographic material and information about a second cryptographic algorithm.

12. The system of claim 6 wherein the instructions that cause the system to perform the cryptographic operation on the datum using the first cryptographic key to create the first cryptographically protected datum and perform the cryptographic operation on the cryptographically protected datum using the second cryptographic key to create the second cryptographically protected datum are executable to cause the system to segment a result of the cryptographic operation on the datum to obtain the cryptographically protected datum.

13. The system of claim 6 wherein the instructions that cause the system to perform the cryptographic operation on the datum using the first cryptographic key to create the first cryptographically protected datum and perform the cryptographic operation on the cryptographically protected datum using the second cryptographic key to create the second cryptographically protected datum are executable to cause the system to segment the datum into individual blocks and perform the cryptographic operation on each block of the individual blocks to obtain the first cryptographically protected datum.

14. A non-transitory computer-readable storage medium storing thereon executable instructions that, as a result of being executed by one or more processors of a system, cause the system to at least:
  establish a cryptographically protected communications session by at least communicating with another system such that both the system and the other system are able to use a first cryptographic material and a second cryptographic material;
  derive a first cryptographic key based on the first cryptographic material and derive a second cryptographic key based on the second cryptographic material;
  perform a cryptographic operation on a datum using the first cryptographic key to create a first cryptographically protected datum;
  perform the cryptographic operation on the first cryptographically protected datum using the second cryptographic key; and
  transmit a result of the cryptographic operation on the first cryptographically protected datum over the cryptographically protected communications session,
  wherein the first encryption key corresponds to a first cryptographic algorithm and the second encryption key corresponds to a second cryptographic algorithm.

15. The non-transitory computer-readable storage medium of claim 14, wherein the instructions that cause the system to perform the cryptographic operation on the datum to create the first cryptographically protected datum comprise instructions to cause the system to serialize a result of the cryptographic operations on the datum to obtain the first cryptographically protected datum.

16. The non-transitory computer-readable storage medium of claim 14, wherein the instructions that cause the system to perform the cryptographic operation on the datum to create the first cryptographically protected datum comprise instructions to cause the system to serialize the datum into a serialized datum and perform the cryptographic operation on the serialized datum to create the first cryptographically protected datum.

17. The non-transitory computer-readable storage medium of claim 14, wherein the instructions that cause the system to perform the cryptographic operation on the datum to create the first cryptographically protected datum comprise instructions to cause the system to serialize the datum into a serialized datum and perform the cryptographic operation on the serialized datum, and serialize a result of the cryptographic operations on the serialized datum to obtain the first cryptographically protected datum.

18. The non-transitory computer-readable storage medium of claim 14, wherein the instructions that cause the computer system to establish a cryptographically protected communications session with the other system further include instructions that cause the computer system to receive, from the other system, the first cryptographic material in response to a first message transmitted from the system to the other system, the first message comprising information about a first cryptographic algorithm and information about a second cryptographic algorithm.

19. The non-transitory computer-readable storage medium of claim 14, wherein the instructions that cause the computer system to establish a cryptographically protected communications session with the other system further include instructions that cause the computer system to transmit, to the other system, a first message comprising the second cryptographic material, the first message indicating a first cryptographic algorithm and a second cryptographic algorithm and, in response to the first message, receive from the other system a response comprising the first cryptographic material.

* * * * *